(12) United States Patent
Casella et al.

(10) Patent No.: US 11,107,367 B2
(45) Date of Patent: Aug. 31, 2021

(54) ADAPTIVE ASSEMBLY GUIDANCE SYSTEM

(71) Applicant: Apple Inc., Cupertino, CA (US)

(72) Inventors: Tyler L. Casella, Martinez, CA (US);
Edwin W. Foo, Sunnyvale, CA (US);
Norman N. Wang, Saratoga, CA (US);
Ken Wakasa, Tokyo-To (JP)

(73) Assignee: Apple Inc., Cupertino, CA (US)

( * ) Notice: Subject to any disclaimer, the term of this patent is extended or adjusted under 35 U.S.C. 154(b) by 456 days.

(21) Appl. No.: 15/643,413

(22) Filed: Jul. 6, 2017

(65) Prior Publication Data

US 2018/0277015 A1 Sep. 27, 2018

Related U.S. Application Data

(60) Provisional application No. 62/477,304, filed on Mar. 27, 2017.

(51) Int. Cl.
*G09B 19/00* (2006.01)
*G06K 9/62* (2006.01)
(Continued)

(52) U.S. Cl.
CPC ........... *G09B 19/0053* (2013.01); *G06F 8/34* (2013.01); *G06F 9/453* (2018.02); *G06K 9/62* (2013.01); *G09B 5/06* (2013.01); *G09B 7/02* (2013.01)

(58) Field of Classification Search
CPC ....... G09B 19/0053; G06F 9/453; G06F 8/34; A63H 33/04; G05B 2219/31027
See application file for complete search history.

(56) References Cited

U.S. PATENT DOCUMENTS

| | | | |
|---|---|---|---|
| 5,656,907 A | 8/1997 | Chainani | |
| 2005/0249351 A1* | 11/2005 | Miyahara | G06Q 99/00 380/255 |

(Continued)

FOREIGN PATENT DOCUMENTS

HK 1216278 A 10/2016

OTHER PUBLICATIONS

Byrne, "JIMU Robot MeeBot Kit from Ubtech Robotics," YouTube, Oct. 5, 2016, retrieved from https://www.youtube.com/watch?v=8nZ5N0cLgdE&feature=youtu.be, 8 pages.

(Continued)

*Primary Examiner* — Peter R Egloff
(74) *Attorney, Agent, or Firm* — Morgan, Lewis & Bockius LLP

(57) ABSTRACT

A device implementing an adaptive assembly guidance system includes an image sensor and a processor configured to capture, using the image sensor, an image of a set of connectable components. The processor is further configured to process the captured image to detect individual connectable components of the set of connectable components and to detect a current configuration of the set of connectable components. The processor is further configured to determine, based at least in part on the detected individual connectable components of the set of connectable components, a recommended configuration of the set of connectable components. The processor is further configured to display information for assembling the set of connectable components into the recommended configuration from the current configuration.

19 Claims, 10 Drawing Sheets

(51) Int. Cl.
*G09B 7/02* (2006.01)
*G09B 5/06* (2006.01)
*G06F 8/34* (2018.01)
*G06F 9/451* (2018.01)

(56) References Cited

U.S. PATENT DOCUMENTS

| | | | |
|---|---|---|---|
| 2009/0198365 A1* | 8/2009 | Seaman | G05B 19/41805 700/108 |
| 2013/0134212 A1* | 5/2013 | Chang | H04L 67/327 235/375 |
| 2013/0278635 A1* | 10/2013 | Maggiore | G06T 19/006 345/633 |
| 2014/0170606 A1 | 6/2014 | Chong | |
| 2015/0258435 A1* | 9/2015 | Zhang | A63H 33/046 463/36 |
| 2016/0104386 A1* | 4/2016 | Kruglick | G06Q 10/0833 434/309 |
| 2016/0284232 A1 | 9/2016 | Sisamos | |
| 2016/0379519 A1 | 12/2016 | Gupta | |
| 2017/0053550 A1 | 2/2017 | Lau et al. | |
| 2017/0221383 A1* | 8/2017 | Karol | A63H 33/042 |
| 2017/0344127 A1* | 11/2017 | Hu | G06K 9/00744 |
| 2018/0025659 A1* | 1/2018 | Liu | G09B 5/065 434/365 |

OTHER PUBLICATIONS

Anonymous, "Olympus Image Share (smartphone app) | Olympus Imaging—Setup Easy Setup," Olympus, Dec. 16, 2016, retrieved from https://web.archive.org/web/20161220201330/http://app.olympus-imaging.com/oishare/en/qr.html, 3 pages.

International Search Report and Written Opinion from PCT/US2018/014541, dated Apr. 17, 2018. 11 pages.

* cited by examiner

ADAPTIVE ASSEMBLY GUIDANCE SYSTEM

CROSS-REFERENCE TO RELATED APPLICATIONS

The present application claims the benefit of U.S. Provisional Patent Application Ser. No. 62/477,304, entitled "Adaptive Assembly Guidance System," filed on Mar. 27, 2017, which is hereby incorporated by reference in its entirety for all purposes.

TECHNICAL FIELD

The present description relates generally to assembly guidance, including to an adaptive assembly guidance system.

BACKGROUND

Educational coding applications may provide coding lessons that allow users to learn how to code in an interactive manner. For example, an educational coding application may display a user interface that includes an input area for a user to input code, and a display area for a user to view the effect(s) of executing the code. The input area may also display guidance in the form of a coding lesson that facilitates the user with inputting the code. The coding lesson may involve manipulating, such as modifying/moving, a virtual item in a virtual world displayed in the display area, such as moving a character through the virtual world. Educational coding devices may also allow users to learn how to code in an interactive manner; however, the education coding devices may involve manipulating, such as modifying/moving, a physical item in the real world, e.g., an educational coding toy.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
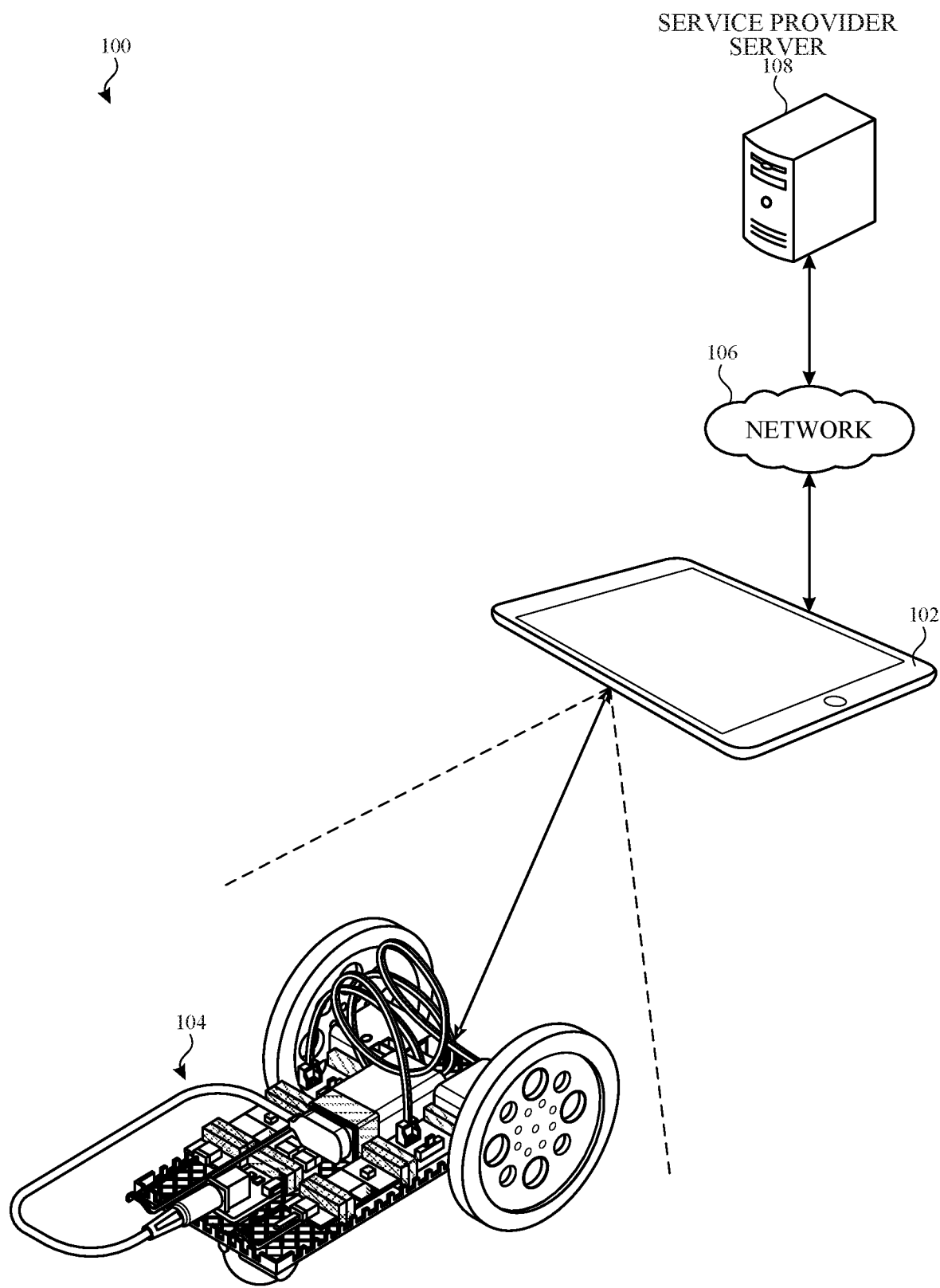
FIG. 1 illustrates an example network environment in which an adaptive assembly guidance system may be implemented in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Educational coding applications may provide users with coding lessons that involve controlling a virtual item, such as a character, in a virtual world, and educational coding devices may allow users to learn coding concepts based on controlling a programmable physical item in the real world. The subject system bridges these two learning approaches by allowing educational coding applications to provide coding lessons that involve controlling a proximate programmable physical item in the real world. For example, a sensor of a device providing an educational coding application, such as an image sensor, may be used to detect and identify a programmable physical item in a proximate area, such as based on a visual identifier associated with the programmable physical item. Responsive to detecting and identifying the programmable physical item, the educational coding application may load a library of functions for programming the programmable physical item, such as to perform one or more actions. The educational coding application may expose the library of functions, or otherwise make the library of functions accessible to a user, such as in conjunction with a coding lesson that involves programming the programmable physical item.

For example, as part of the coding lesson a user may input code that includes one or more of the functions for programming the programmable physical item, such as to cause the programmable physical item to perform one or more actions. The code may be translated into a set of commands for programming the programmable physical item, and the set of commands may be transmitted to the programmable physical item. When the set of commands is received and executed by the programmable physical item, the programmable physical item may perform the one or more actions, thereby providing real world feedback with respect to the coding lesson, which may facilitate the user's learning process.

In one or more implementations, the programmable physical item may include a set of connectable components, such as a set of LEGOs, a set of pieces of a model kit, and/or generally any set of connectable components. The different coding lessons of the educational coding application may be associated with respective recommended configurations of the programmable physical item. For example, for a coding lesson that involves causing a movement of the programmable physical item, the recommended configuration of the programmable physical item may include a motor and one or more wheels. The subject system may identify a current configuration of the set of connectable components, e.g. based on detecting respective visual identifiers associated with the individual components, and may determine whether the current configuration is equivalent to the recommended configuration for a coding lesson. When the current configuration is inequivalent to the recommended configuration for a coding lesson, the subject system may display a sequence of assembly steps to facilitate the user with reconfiguring the set of connectable components into the recommended configuration. In one or more implementations, if the current configuration is inequivalent to the recommended configuration for a coding lesson, the subject system may dynamically provide, based on the current configuration, a variation of the coding lesson and/or a variation of the library of functions exposed, such as a subset of the coding lesson and/or a subset of the library of function.

FIG. 1 illustrates an example network environment 100 in which an adaptive assembly guidance system may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 102, a programmable physical item 104, a network 106, and a service provider server 108. The network 106 may communicatively couple, for example, the electronic device 102 to the service provider server 108. The electronic device 102 may communicate with the programmable physical item 104 via a direct communication link, such as a Bluetooth communication link, that bypasses the network 106. The electronic device 102 may also communicate with the programmable physical item 104 over the network 106. In one or more implementations, the network 106 may be an interconnected network of devices that may include, or may be communicatively coupled to, the Internet.

The service provider server 108 may include one or more server devices that may facilitate a service being provided to a user via the electronic device 102, such as an educational coding service. In one or more implementations, the one or more service provider servers 108 may include and/or be communicatively coupled to one or more servers corresponding to one or more programmable physical items, such as servers associated with manufacturers of the programmable physical items. The service provider server 108 may be, and/or may include all or part of, the electronic system discussed below with respect to FIG. 10.

The electronic device 102 may be, for example, a portable computing device such as a tablet device, a laptop computer, a smartphone, a smart watch, or other appropriate devices that include one or more sensors, such as image sensors, infrared sensors, thermal sensors, and the like, and/or that include one or more wired or wireless communication interfaces, such as one or more universal serial bus (USB) interfaces, near-field communication (NFC) radios, wireless local area network (WLAN) radios, Bluetooth radios, Zigbee radios, cellular radios, and/or other wireless radios. In FIG. 1, by way of example, the electronic device 102 is depicted as a tablet device. An example electronic device 102 may be, and/or may include all or part of, the electronic device discussed below with respect to FIG. 2 and/or the system discussed below with respect to FIG. 10.

The programmable physical item 104 may be any physical item or device that can be programmed, such as to perform one or more tasks, movements, and the like. For example, the programmable physical item may include a processor (or controller) for executing commands (or instructions) and memory for storing commands (or instructions). The programmable physical item 104 may further include a wired or wireless communication interface for communicating with, for example, the electronic device 102. The communication interface may be and/or may include, for example, USB interface, an NFC radio, a WLAN radio, a Bluetooth radio, a Zigbee radio, a cellular radios, and/or other wireless radios or wired interfaces.

The programmable physical item 104 may be associated with a visual identifier (or visual cue) that can be used to distinctly identify the programmable physical item 104, and/or to determine an address or identifier for communicating with the programmable physical item 104. The visual identifier may be, for example, a particular color scheme of the programmable physical item 104, a particular shape of the programmable physical item 104, a particular marking on the programmable physical item 104, such as quick response (QR) codes or other bar codes or markings, a visual feature or marking that is exposed through image processing, and/or generally any combination thereof.

In one or more implementations, the programmable physical item 104 may include a set of connectable components. For example, the set of connectable components may be and/or may include one or more LEGOs, such as a LEGO MINDSTORMS EV3 set, one or more LITTLE BITs, such as a LITTLE BITS KIT, one or more parts of a device, such as a PARROT MINIDRONE, and/or generally any set of connectable components. One or more of the set of connectable components may be connected and/or one or more of the set of connectable components may be disconnected. In one or more implementations, the connectable components may be connected together by, for example, magnetic connections and/or physical connections.

For explanatory purposes, the programmable physical item 104 of FIG. 1 is depicted as including a set of connectable components that are all connected, e.g. each connectable component is connected to at least one other connectable component. However, it will be understood that the programmable physical item 104 may also be a set of connectable components of which none of the connectable components are connected, e.g. none of the connectable components are connected to any other of the connected components, or one or more but not all of the connectable components are connected. Furthermore, the programmable physical item 104 of FIG. 1 may be only a single connectable component, or a single component, of a set of components.

The individual components of the set of connectable components may each be associated with a distinct visual identifier (or visual cue) that can be used to identify each of the individual components and/or to identify a type of each of the individual components. The visual identifiers may be, for example, built into the overall design and/or aesthetic of the components such that the visual cues may not be noticeable to a person handling the components. For example, the visual identifiers may include variations in colors of the individual components, variations in shapes of the individual components, markings on the individual components, such as QR codes or other markings, and/or generally any combination thereof.

In one or more implementations, one or more of the individual components may be associated with different functionality. For example, one or more of the components may include a communication interface, such as a Bluetooth interface, for receiving commands from the electronic device 102, one or more of the components may include sensors for performing measurements, such as gyroscopes, one or more of the components may include computational resources, such as processors, memory, and the like, one or more of the components may be action components that are capable of performing an action, such as a motor, etc. When the individual components are connected together the components may be capable of communicating with each other such that commands received via a component that includes a communication interface may be communicated to other components of the programmable physical item 104, such as the action components.

In the subject system, the electronic device 102 may provide an educational coding application that may provide coding lessons to users, such as to teach users to code in a particular programming language, e.g. the SWIFT programming language. One or more of the coding lessons may be associated with a programmable physical item 104, and the coding lessons may be activated when the programmable physical item 104 is in a detectable proximity of the electronic device 102. For example, a sensor of the electronic device 102, such as an image sensor, may be used to detect that the programmable physical item 104 is proximate to the electronic device 102. The visual identifier associated with the programmable physical item 104 may be used to identify and/or recognize the programmable physical item 104 and to responsively retrieve one or more coding lessons and/or one or more libraries of functions that are associated with the programmable physical item 104. Upon detecting the programmable physical item 104, the one or more coding lessons and/or the one or more libraries of functions may be exposed or otherwise made accessible to the user, such as via the educational coding application.

The detected visual identifier associated with the programmable physical item 104 may also be used to initiate a connection with the programmable physical item 104. For example, an address or identifier for communicating with the programmable physical item 104, such as via a communication interface of the programmable physical item, may be determinable from the visual identifier. The address or identifier may be, for example, a Bluetooth address, a MAC address, or the like. For example, the electronic device 102 may store and/or may have access to, such as via the service provider server 108, a database that stores associations between visual identifiers, programmable physical items, and identifiers for communicating with the programmable physical items. In one or more implementations, the electronic device 102 may receive information for communicating with the programmable physical item 104 and/or other information regarding the programmable physical item, via an NFC exchange with the programmable physical item 104.

If the programmable physical item 104 has previously paired or established a connection with the electronic device 102, the electronic device 102 may use the address or identifier of the programmable physical item 104 to re-establish a connection with the programmable physical item 104. Alternatively, if the programmable physical item 104 has not previously paired or established a connection with the electronic device 102, the electronic device 102 may initiate pairing or establishing a connection with the programmable physical item 104 using the address or identifier of the programmable physical item 104.

The one or more libraries may include code, such as functions, that can be used to program the programmable physical item 104. The functions may be associated with the individual components of the programmable physical item 104 and/or may be associated with a particular configuration of the programmable physical item 104. For example, if the programmable physical item 104 is in a configuration capable of motion, the functions may cause the programmable physical item 104 to move. Such functions may include, for example, moveForward(distance.), turnRight (byAngle:), turnLeft(byAngle.), and/or moveBackwards (distance.).

In a coding lesson associated with the programmable physical item 104, user input including code may be received from a user participating in the coding lesson, and the code may be translated into commands that are transmitted to the programmable physical item 104, such as via the communication interface of the programmable physical item 104. The one or more commands, when executed by the programmable physical item 104, may cause the programmable physical item 104 to move or to perform a task or action that may coincide with the inputted code, thereby providing the user with real world feedback that may be used in conjunction with the coding lesson. The code provided by the user input may include one or more functions of the one or more libraries that were made accessible to the user upon detection of the programmable physical item 104. Example user interfaces providing coding lessons are discussed further below with respect to FIGS. 5-6.

In one or more implementations, the code and/or functions of the one or more libraries provide a layer of abstraction over the commands that are executed by the programmable physical item 104. For example, if the programmable physical item 104 includes multiple motors, such as to drive multiple sets of wheels, separate commands may need to be provided to each of the motors. However, through the abstraction layer provided by the one or more libraries of the subject system, a single function call of moveForward (distance:) may be translated into separate commands that are transmitted to the programmable physical item 104, and provided to the motors of the programmable physical item 104.

In one or more implementations, a coding lesson may be associated with a recommended configuration of the programmable physical item 104. For example, the coding lesson may be authored based on a presumption that the programmable physical item 104 includes certain components, e.g. wheels or motors, and/or that the components are assembled in a particular manner. Thus, before providing access to such a coding lesson and/or libraries associated therewith, the electronic device 102 may confirm that a current configuration of the programmable physical item 104 is equivalent to the recommended configuration for the coding lesson. The electronic device 102 may determine the current configuration of the programmable physical item 104, for example, based on detecting the arrangement of the individual components, such as based on the visual identifiers associated with the individual components.

If the electronic device 102 determines that the current configuration of the programmable physical item 104 is not equivalent to the recommended configuration for the coding lesson, the electronic device 102 may provide a sequence of assembly steps to facilitate a user with reconfiguring the programmable physical item 104 into the recommended configuration. Example user interfaces providing assembly steps to facilitate a user with reconfiguring the programmable physical item 104 are discussed further below with respect to FIGS. 7-9.

Alternatively, and/or in addition, the electronic device 102 may determine whether a variation of the coding lesson and/or a variation of the one or more libraries can be provided based on the current configuration of the programmable physical item 104. For example, if the programmable physical item 104 is missing wheels and/or a motor and the coding lesson partially involves coding that causes a movement of the programmable physical item 104, the portion of the coding lesson that deals with the movement and/or the libraries associated with the movement, may not be made accessible to the user. Thus, a subset of the coding lesson and/or a subset of the one or more libraries may be provided instead. An example process of an electronic device 102 implementing the subject system is discussed further below with respect to FIG. 3.

In one or more implementations, the subject system may be used outside of the context of a coding lesson. For example, an application may be provided that may be interacted with by a user. The user may input code, e.g. outside of the context of a coding lesson, and the code may be translated into commands that are transmitted to the programmable physical item 104. In this instance, a user may benefit from the layer of abstraction provided by the subject system such that the programmable physical item 104 can more easily be programmed.

In one or more implementations, the subject system may also be used outside of the context of a coding lesson to provide guidance with assembling a set of connectable components and/or connectable parts into a particular configuration, such as a recommended configuration. The set of connectable components may be, for example, a set of LEGOs (e.g. a non-programmable set of LEGOs), a set of pieces of a model kit, a set of parts of a furniture item to be assembled, and/or generally any set of connectable components. An example process of providing assembly steps to facilitate a user with assembling a set of connectable components and/or connectable parts into a recommended configuration is discussed further below with respect to FIG. 4.

For explanatory purposes, the subject system is discussed herein with respect to a programmable physical item. However, as discussed above, the subject system is not limited to programmable physical items nor is the subject system limited to physical items. For example, the subject system may also be applicable to projections of physical items, such as two-dimensional projections and/or three-dimensional/holographic projections.

Figure 2:
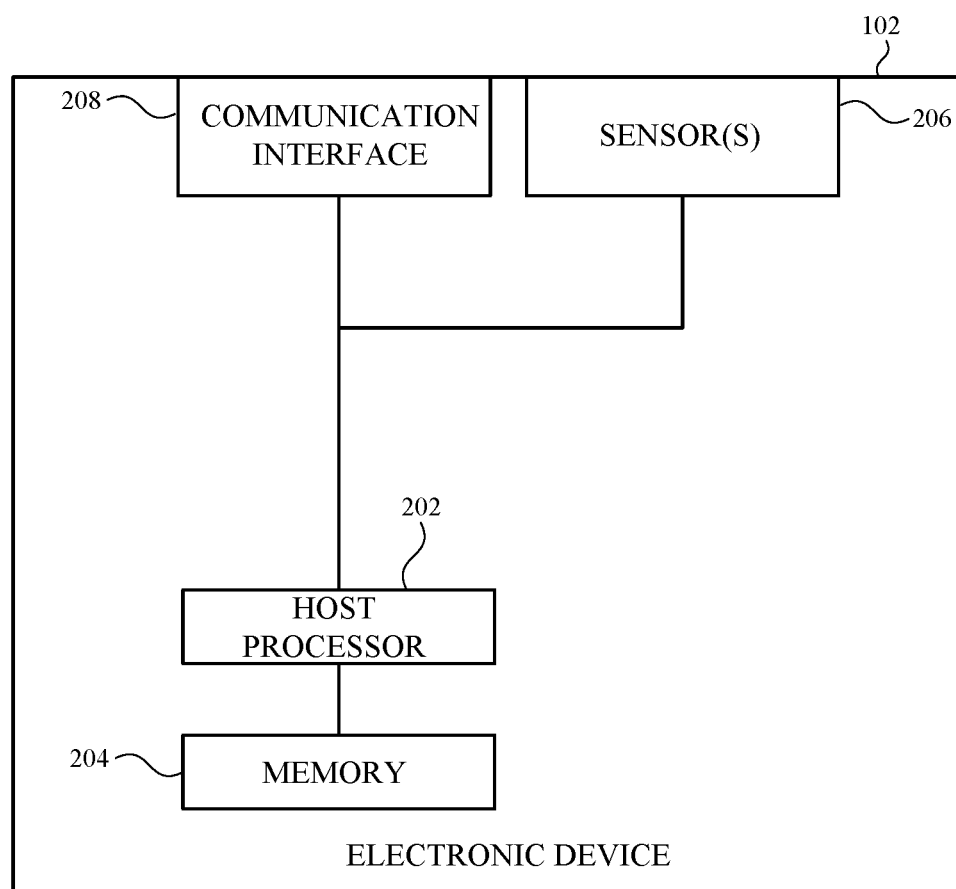
FIG. 2 illustrates an example electronic device that may be used in an adaptive assembly guidance system in accordance with one or more implementations.

FIG. 2 illustrates an example electronic device 102 that may be used in an adaptive assembly guidance system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. In one or more implementations, one or more components of the example electronic device 102 may be implemented the programmable physical item 104.

The electronic device 102 may include a host processor 202, a memory 204, a communication interface 208, and one or more sensors 206. The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. Additionally, the host processor 202 may enable implementation of an operating system or otherwise execute code to manage operations of the electronic device 102. The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The communication interface 208 may include suitable logic, circuitry, and/or code that enables wired or wireless communication, such as over the network 106 with the service provider server 108 and/or directly with the programmable physical item 104. The communication interface 208 may include, for example, one or more of a Bluetooth communication interface, an NFC interface, a Zigbee communication interface, a WLAN communication interface, a USB communication interface, or generally any communication interface. The one or more sensors 206 may include, for example, one or more image sensors, one or more infrared sensors, one or more thermal sensors, and/or generally any sensors that may be used to detect the programmable physical item 104, the individual components of the programmable physical item 104, and/or a current configuration of the programmable physical item 104. In one or more implementations, the communication interface 208 may be used to detect the programmable physical item 104, such as by detecting beacon signals transmitted by the programmable physical item 104 and/or one or more components thereof.

In one or more implementations, one or more of the host processor 202, the memory 204, the one or more sensors 206, the communication interface 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
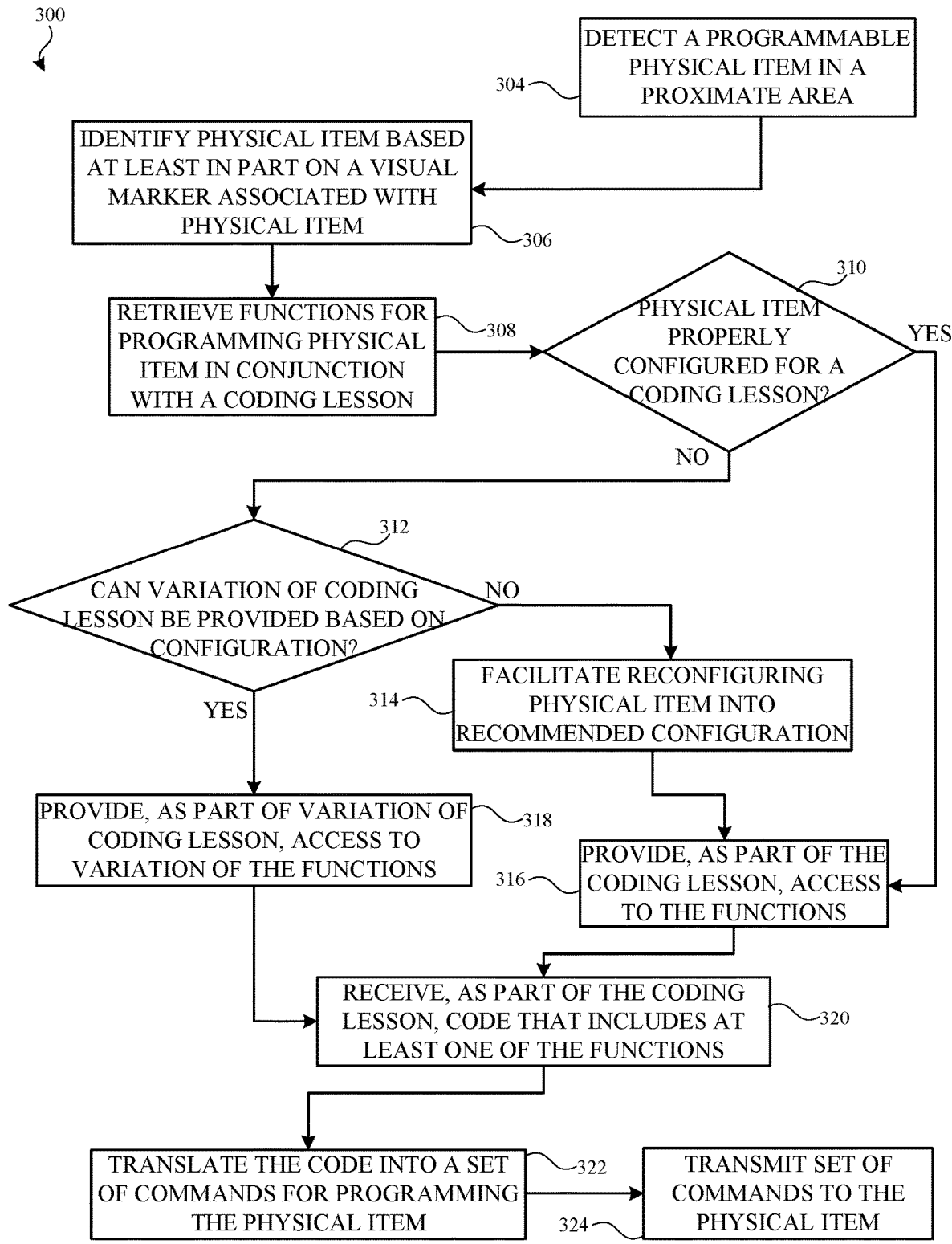
FIG. 3 illustrates a flow diagram of an example process for dynamic library access based on proximate programmable item detection in accordance with one or more implementations.

FIG. 3 illustrates a flow diagram of an example process 300 for dynamic library access based on proximate programmable item detection in accordance with one or more implementations. For explanatory purposes, the process 300 is primarily described herein with reference to the electronic device 102 and the programmable physical item 104 of FIG. 1. However, the process 300 is not limited to the electronic device 102 and/or the programmable physical item 104 of FIG. 1, and one or more blocks (or operations) of the process 300 may be performed by one or more other components or chips of the electronic device 102 and/or of the programmable physical item 104. The electronic device 102 also is presented as an exemplary device and the operations described herein may be performed by any suitable device. Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

The process 300 begins when the electronic device 102 detects a programmable physical item 104 is in a proximate area, such as by using the one or more sensors 206 (304). In one or more implementations, the detection may be performed within an educational coding application, such as to participate in a coding lesson associated with the programmable physical item 104. For example, the electronic device 102 may capture an image of the programmable physical item 104 using an image sensor and/or the electronic device 102 may use any other suitable sensor to detect the programmable physical item 104.

The electronic device 102 may identify the programmable physical item 104 based at least in part on a visual identifier (or visual cue) associated with the programmable physical item 104 (306). For example, when an image of the programmable physical item 104 is captured using an image sensor, the electronic device 102 may perform pattern recognition on the captured image to identify the programmable physical item 104 and/or the individual components thereof. The electronic device 102 may store and/or may have access to a database that associates distinct visual identifiers with programmable physical items and/or components thereof.

Upon identifying the programmable physical item 104 (106), the electronic device 102 retrieves a library of functions for programming the programmable physical item 104 in conjunction with a coding lesson (308). The library of functions may include one or more functions that can be used to program the programmable physical item 104, for example, when the programmable physical item 104 is in a recommended configuration associated with the coding lesson. Thus, the electronic device 102 determines whether the programmable physical item 104 is properly configured for the coding lesson, such as by determining whether a current configuration of the programmable physical item 104 is equivalent to a recommended configuration of the programmable physical item 104 for the coding lesson (310).

If the electronic device 102 determines that the physical item is not properly configured for the coding lesson (310), the electronic device 102 determines whether a variation of the coding lesson can be provided based on the current configuration of the programmable physical item 104 (312). For example, the electronic device 102 may determine whether there are any discrete portions of the coding lesson that cannot be completed based on the current configuration and therefore can be filtered out of the coding lesson. If the electronic device 102 determines that a variation of the coding lesson can be provided based on the current configuration of the programmable physical item 104 (312), the electronic device 102 dynamically provides access to the variation of the coding lesson, and dynamically provides, as part of the variation of the coding lesson, access to a variation of the library of functions, such as a subset of the library of functions (312). For example, the electronic device 102 may provide the user with access to the subset of the library of functions by exposing the subset of the library of functions to the user.

If the electronic device 102 determines that there is no variation of the coding lesson that can be provided based on the current configuration of the programmable physical item 104 (312), and/or if the user indicates that they do not want to participate in a variation of the coding lesson, the electronic device 102 facilitates the user with reconfiguring the programmable physical item 104 into the recommended configuration for the coding lesson (314). For example, the electronic device 102 may provide information regarding a sequence of assembly steps that can be performed to reconfigure the programmable physical item 104 from the current configuration to the recommended configuration. An example process of providing information for reconfiguring a physical item is discussed further below with respect to FIG. 4. If the electronic device 102 cannot determine a variation of the coding lesson (312), and the programmable physical item 104 is not reconfigured into the recommended configuration for the coding lesson (314), the electronic device 102 may prevent the user from accessing the coding lesson.

Once the programmable physical item 104 has been reconfigured into the recommended configuration for the coding lesson (314), or if the programmable physical item 104 is in the proper configuration for the coding lesson (310), the electronic device 102 provides access to the coding lesson and, as part of the coding lesson, the electronic device 102 provides access to the library of functions associated with the programmable physical item 104 (316).

After providing access to the coding lesson (316) or the variation of the coding lesson (318), the electronic device 102 receives, as part of the coding lesson (or variation thereof), code that includes at least one of the functions of the library of functions (or variation thereof) for which the user was provided access to (320). For example, the electronic device 102 may receive user input that includes code containing at least one of the functions of the library of functions. The electronic device 102 translates the received code into a set of commands for programming the programmable physical item 104 (322). For example, the code may be translated into a set of native commands that can be interpreted and executed by the programmable physical item 104, such as by a processor or controller of the programmable physical item 104.

The electronic device 102 transmits the set of commands to the programmable physical item 104 (324), such as via the communication interface 208. For example, the electronic device 102 may establish a connection with a communication interface of the programmable physical item 104 when the programmable physical item 104 is detected (304), and/or any time thereafter. The electronic device 102 transmits the set of commands to the programmable physical item 104 (324). The programmable physical item 104 may execute the commands, which may cause an action or movement of the programmable physical item 104 that corresponds to the code provided by the user, thereby providing the user with real-world feedback with respect to the inputted code.

Figure 4:
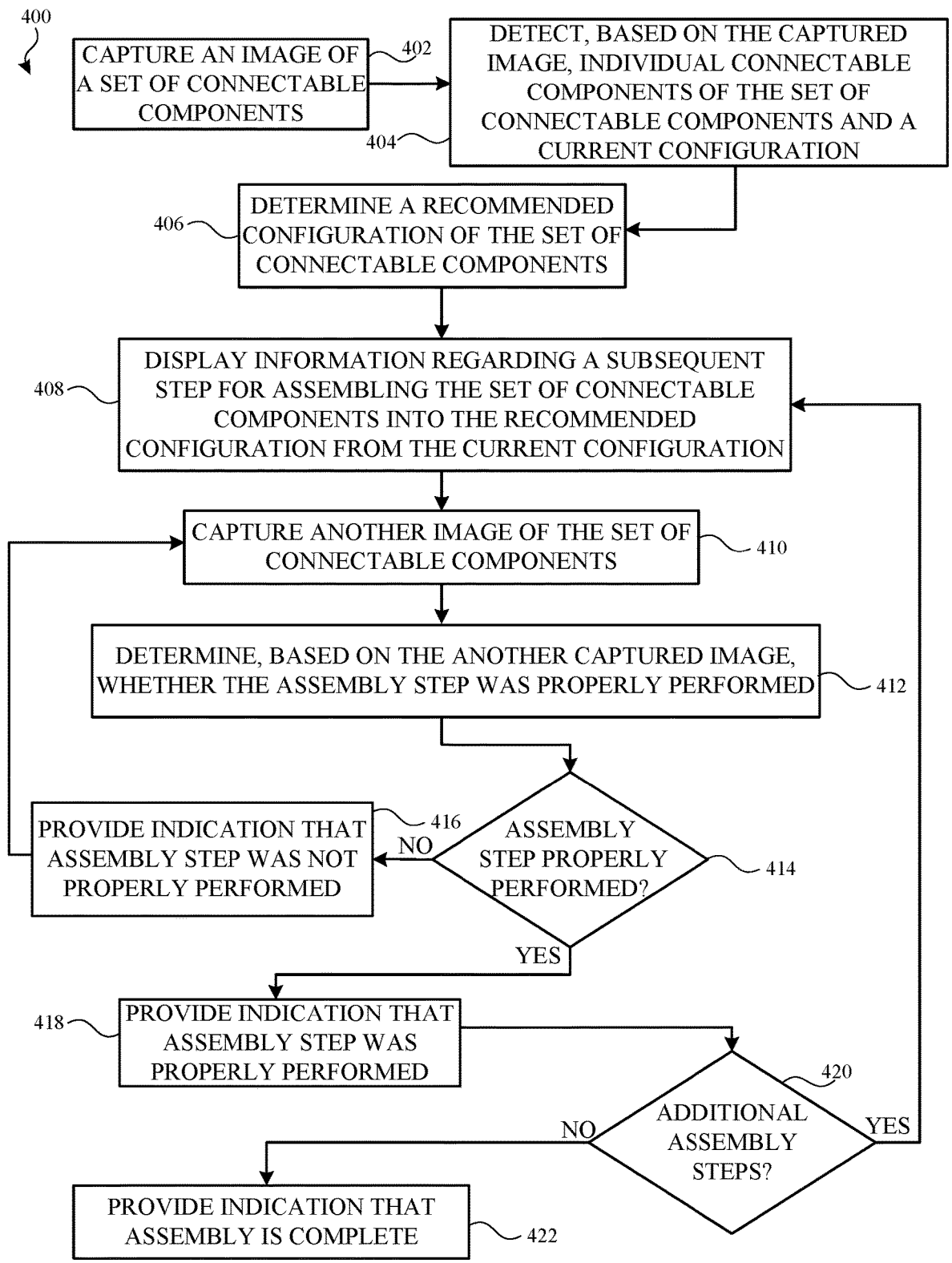
FIG. 4 illustrates a flow diagram of an example process for facilitating a reconfiguration of a proximate programmable item in accordance with one or more implementations.

FIG. 4 illustrates a flow diagram of an example process 400 for facilitating a reconfiguration of a proximate programmable item in accordance with one or more implementations. For explanatory purposes, the process 400 is primarily described herein with reference to the electronic device 102 and the programmable physical item 104 of FIG. 1. However, the process 400 is not limited to the electronic device 102 and/or the programmable physical item 104 of FIG. 1, and one or more blocks (or operations) of the process 400 may be performed by one or more other components or chips of the electronic device 102 and/or of the programmable physical item 104. The electronic device 102 also is presented as an exemplary device and the operations described herein may be performed by any suitable device. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The process 400 begins when the electronic device 102 captures an image of a set of connectable components, such as by using the one or more sensors 206 (402). In one or more implementations, the set of connectable components may be represented by the programmable physical item 104 of FIG. 1. The electronic device 102 detects (or recognizes), based on the captured image, the individual connectable components of the set of the connectable components and a current configuration of the set of connectable components (404).

For example, the electronic device 102 may perform pattern recognition on the captured image to identify the individual connectable components, and/or to identify a current configuration of the connectable components, based at least in part on the one or more distinct visual identifiers (or visual cues) associated with each of the connectable components. The visual identifiers may be, for example, built into the overall design and/or aesthetic of the connectable components such that the visual cues may not be noticeable to a person handling the components. For example, the visual identifiers may include variations in colors of the connectable components, variations in shapes of the connectable components, markings on the connectable components, such as QR codes or other markings, and/or generally any combination thereof. In one or more implementations, the electronic device 102 may store and/or may have access to a data structure, such as a database that stores associations between the distinct visual identifiers, the individual connectable components and/or the types of individual connectable components, and/or identifiers for communicating with one or more of the individual connectable components.

In one or more implementations, the electronic device 102 may process the captured image based on one or more of hue space, brightness, color space, luminosity, and the like. The electronic device 102 may perform edge detection on the captured image to detect the edges of the individual connectable components and may construct the shapes of the individual connectable components based on the detected edges. The electronic device 102 may identify the individual connectable components based at least in part on the determined shapes, the colors of the connectable components and/or location of colors on the connectable components, and/or generally any other visible or detectable features. The electronic device 102 may also use one or more image sensors to generate a depth map for the captured image to reconcile the individual connectable components, such as based on the directions in which the individual connectable components are extended. In one or more implementations, the electronic device 102 may use a thermal sensor to determine which of the connectable components was most recently handled by a user, e.g. the connectable component with a different heat signature than the other connectable components.

Once the electronic device 102 detects the individual connectable components of the set of connectable components and/or the current configuration of the set of connectable components (406), the electronic device 102 retrieves one or more recommended configurations for the set of connectable components (406). For example, if the electronic device 102 identifies the connectable components as being pieces of a LEGO set, the device may retrieve the manufacturer's recommended configuration for the LEGO set, as well as information describing each assembly step of a sequence of assembly steps to assemble the pieces into the recommended configuration. The electronic device may retrieve the information from a local data structure and/or from the service provider server 108 via the network 106. One or more of the assembly steps to assemble the connectable components may be associated with an indication, such as an image, of a configuration of the connectable components after the assembly step has been completed, and/or information describing the arrangement of the connectable components relative to one another after the assembly step has been completed.

In one or more implementations, the recommended configuration for the set of connectable components may be a recommended configuration for participating in a particular activity, such as participating in a coding lesson provided by a coding educational application, as is discussed further above with respect to FIG. 3. In one or more implementations, when there are multiple recommended configurations for a particular set of connectable components, the electronic device 102 may display a representation of each of the recommended configurations to a user for selection. The electronic device 102 may subsequently receive a selection of one of the recommended configurations, such as from the user.

The electronic device 102 determines, based on the current configuration of the set of connectable components identified from the image and the retrieved information regarding the recommendation configuration, an indication of a subsequent assembly step for assembling the components into the recommended configuration, and the electronic device 102 displays the indication as well as information associated with the subsequent assembly step (408). For example, the electronic device 102 may match the current configuration of the set of connectable components to a configuration associated with one of the assembly steps. The electronic device 102 may then determine the subsequent assembly step as the next assembly step in the sequence of assembly steps. If none of the configurations associated with the assembly steps matches the current configuration, then the electronic device 102 may determine that none of the assembly steps have been performed.

In one or more implementations, the indication of the subsequent assembly step may include an image of the configuration associated with the subsequent assembly step. In one or more implementations, the electronic device 102 may display the captured image of the set of connectable components with an overlay that indicates the subsequent component to be connected for the subsequent assembly step, and/or how/where to connect the subsequent component in order to complete the subsequent assembly step.

The electronic device 102 may capture a subsequent image of the set of connectable components, e.g. after receiving an indication from a user that the assembly step has been completed, and the electronic device 102 may determine from the subsequent image whether the assembly step was properly performed (412). For example, the electronic device 102 may process the captured image to determine the configuration of the set of connectable components and may compare the configuration to the configuration associated with the assembly step to determine whether the assembly step was properly performed.

If the electronic device 102 determines that the assembly step was not properly performed (414), the electronic device 102 may provide an indication that the assembly step was not properly performed (416). The indication may include, for example, a visual indication, such as by overlaying a red indicator (such as an 'X') on a display of the subsequent image, e.g., over the connectable component that is improperly connected, and/or an audio indication, such as by outputting a particular sound, e.g. a beeping noise. The electronic device 102 then repeats the capturing and determining steps (410)-(414).

If the electronic device 102 determines that the assembly step was properly performed (414), the electronic device 102 may provide an indication that the assembly step was properly performed (418). The indication may include, for example, a visual indication, such as by overlaying a green indicator (such as a checkmark) on a display of the subsequent image, and/or an audio indication, such as by outputting a particular sound, e.g. a ding. The electronic device 102 then determines whether there are any additional assembly steps in the sequence of assembly steps (420). If the electronic device 102 determines that there are additional assembly steps (420), the electronic device 102 repeats the displaying (408) and the subsequent assembly steps (410)-(420).

If the electronic device 102 determines that there are no additional assembly steps (420), the electronic device 102 provides an indication that the assembly is complete (422). The indication may include, for example, a visual indication and/or an audio indication. If the process 400 was being performed to reconfigure the programmable physical item 104 into a recommended configuration for a particular coding lesson and/or for accessing a particular library, access to the coding lesson and/or the library may be provided in conjunction with providing the indication that the assembly is complete (422). Thus, the process 400 may alleviate the need for assembly manuals, and may also provide adaptive feedback to a user with respect to the assembly steps, thereby facilitating the user reconfiguring and/or assembling the set of connectable components.

Figure 5:
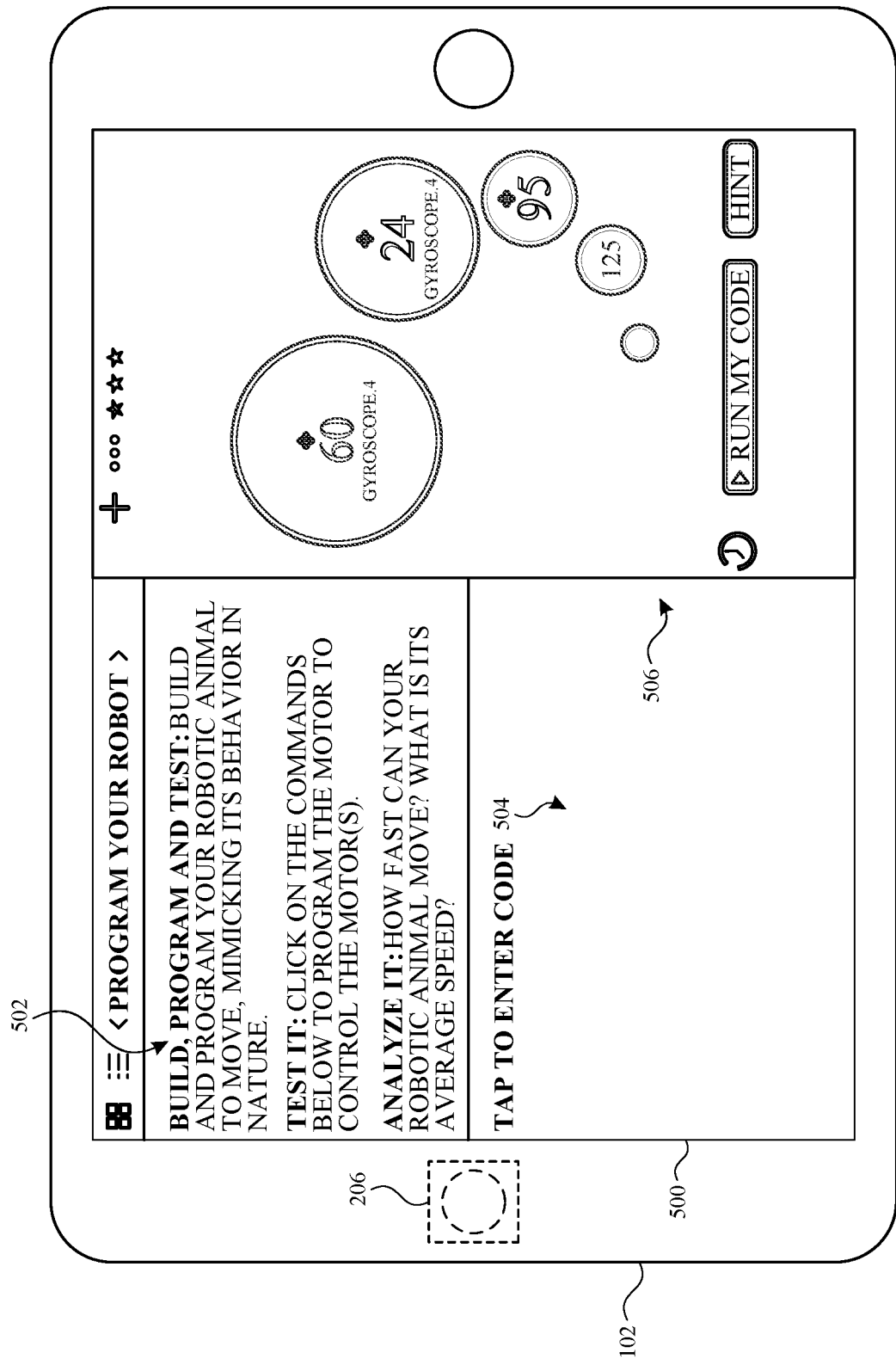
FIG. 5 illustrates an example electronic device displaying an example user interface for providing a coding lesson in accordance with one or more implementations.

FIG. 5 illustrates an example electronic device 102 displaying an example user interface 500 for providing a coding lesson in accordance with one or more implementations. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

The electronic device 102 includes the one or more sensors 206, such as an image sensor, and includes a display screen that displays the user interface 500. The user interface 500 includes a coding lesson area 502, a user input area 504, and a code execution area 506. The coding lesson area 502 may provide information regarding a coding lesson to a user. The user input area 504 may be an area that receives user input, such as code that may include one or more functions associated with a programmable physical item 104. The code execution area 506 may display one or more data points relating to values associated with the execution of the code. For example, the code execution area 506 displays values that will be programmed into the programmable physical item 104 when the commands corresponding to the code are executed by the programmable physical item 104.

Figure 6:
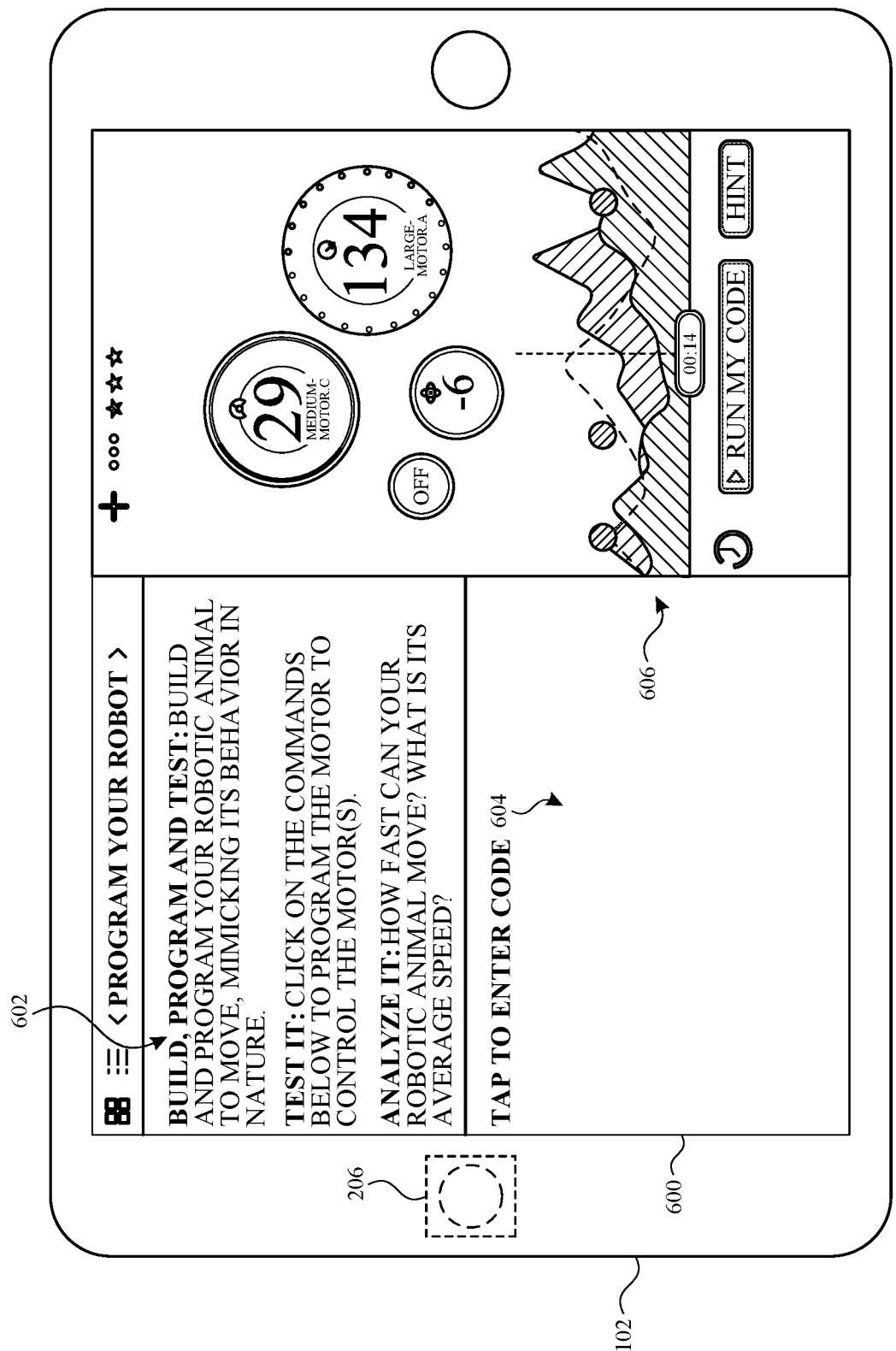
FIG. 6 illustrates an example electronic device displaying an example user interface for executing code generated in a coding lesson in accordance with one or more implementations.

FIG. 6 illustrates an example electronic device displaying an example user interface 600 for executing code generated in a coding lesson in accordance with one or more implementations. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

The electronic device 102 includes the one or more sensors 206, such as an image sensor, and includes a display screen that displays the user interface 600. The user interface 600 includes a coding lesson area 602, a user input area 604, and a code execution area 606. The coding lesson area 602 may provide information regarding a coding lesson to a user. The user input area 604 may be an area that receives user input, such as code that may include one or more functions associated with a programmable physical item 104. The code execution area 606 may display one or more data points relating to values associated with the code as the code is executed, e.g. as the translated commands corresponding to the code are performed by the programmable physical item 104.

Figure 7:
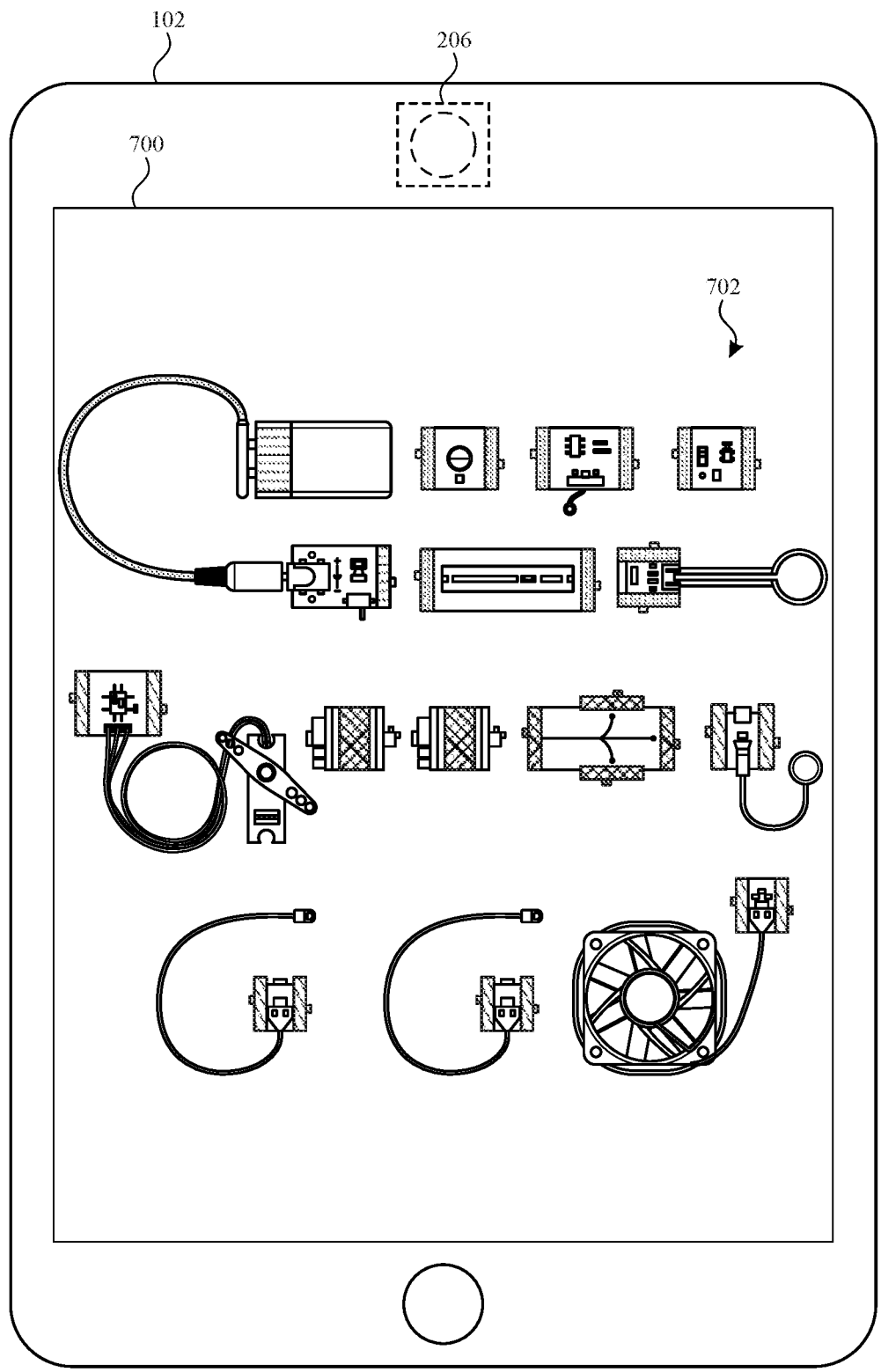
FIG. 7 illustrates an example electronic device displaying an example user interface for identifying a configuration of a set of connectable components in accordance with one or more implementations.

FIG. 7 illustrates an example electronic device 102 displaying an example user interface 700 for identifying a configuration of a set of connectable components in accordance with one or more implementations. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

The electronic device 102 includes the one or more sensors 206, such as an image sensor, and includes a display screen displays the user interface 700. The user interface 700 includes a captured image 702 of a set of connectable components. The set of connectable components may be collectively represented by the programmable physical item 104 of FIG. 1. In one or more implementations, only a single component of the set of connectable components, such as a component that includes a communication interface, may be represented by the programmable physical item 104 of FIG. 1.

The captured image 702 of the set of connectable components shows that none of the connectable components have been connected together. Thus, upon detecting the set of connectable components, such as based on the visual identifiers associated with the set of connectable components, the electronic device 102 may initiate the process 400 in order to assemble the connectable components into, for example, a recommended configuration.

Figure 8:
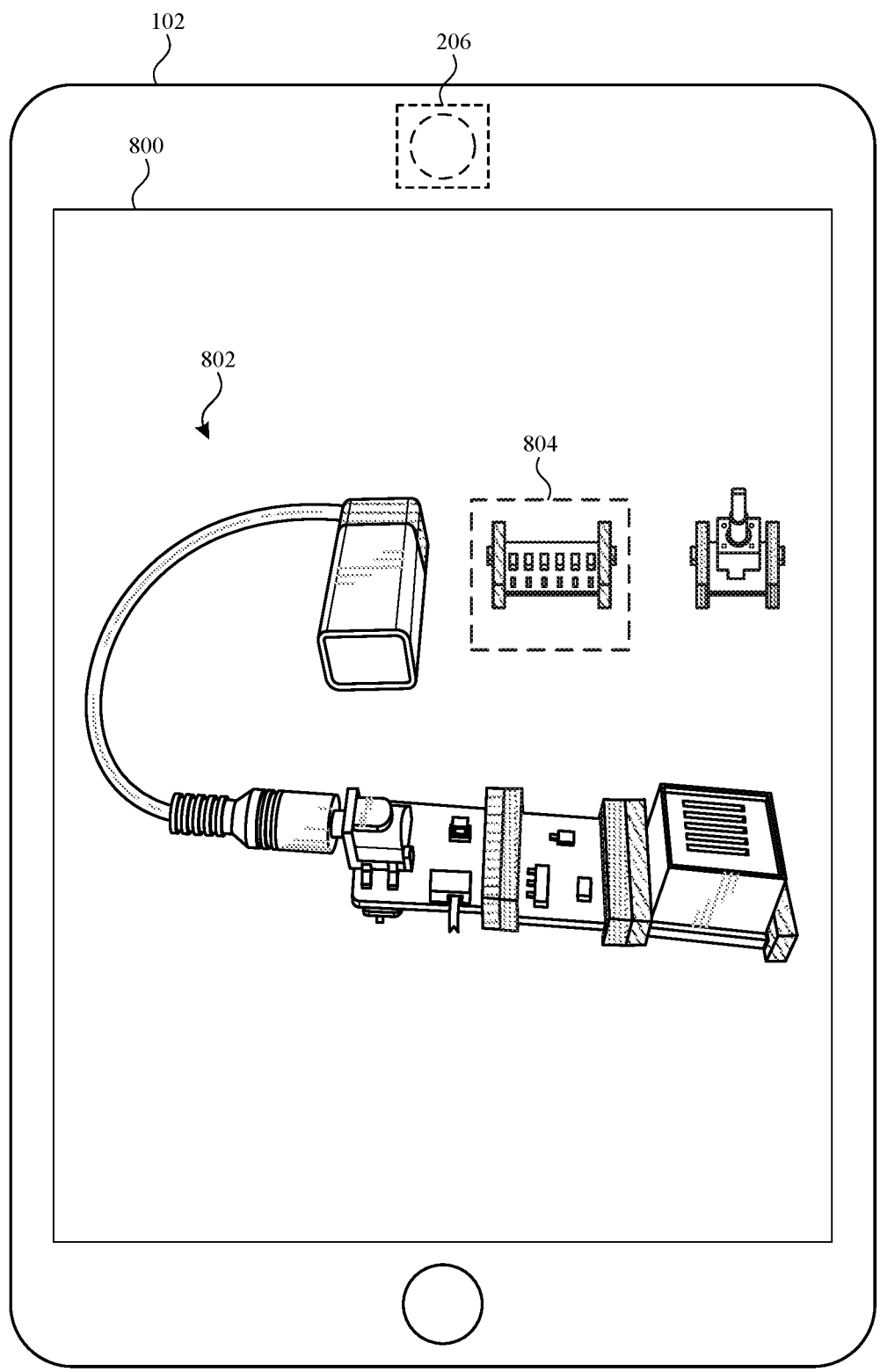
FIG. 8 illustrates an example electronic device displaying an example user interface for facilitating a reconfiguration of the set of connectable components in accordance with one or more implementations.

FIG. 8 illustrates an example electronic device 102 displaying an example user interface 800 for facilitating a reconfiguration of the set of connectable components in accordance with one or more implementations. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

The electronic device 102 includes the one or more sensors 206, such as an image sensor, and includes a display screen that displays the user interface 800. The user interface 800 includes a captured image 802 of a set of connectable components in a current configuration and a component marker 804. In one or more implementations, the set of connectable components of the captured image 802 may be the set of connectable components of the captured image 702 after one or more of the assembly steps of the process 400 have been completed. The component marker 804 may indicate a next connectable component of the set of connectable components to be connected, such as based on a subsequent assembly step.

Figure 9:
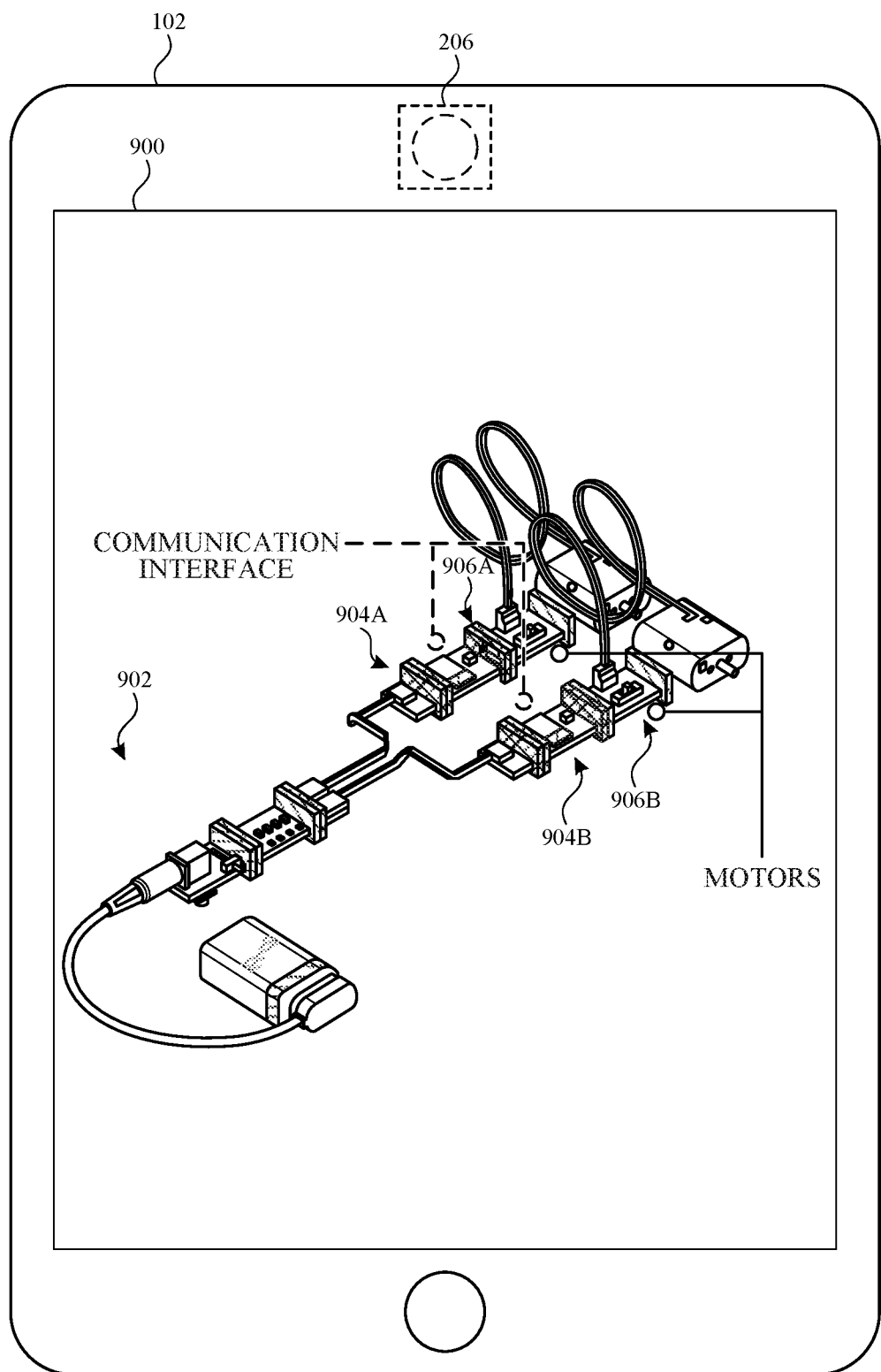
FIG. 9 illustrates an example electronic device displaying an example user interface for indicating a completed reconfiguration of the set of connectable components in accordance with one or more implementations.

FIG. 9 illustrates an example electronic device 102 displaying an example user interface 900 for indicating a completed reconfiguration of the set of connectable components in accordance with one or more implementations. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

The electronic device 102 includes the one or more sensors 206, such as an image sensor, and includes a display screen that displays the user interface 900. The user interface 900 includes a captured image 902 of a set of connectable components that are in a completed configuration. The set of connectable components may include one or more communication components 904A-B that have communication interfaces and/or one or more motor components 906A-B that include motors. In one or more implementations, the programmable physical item 104 of FIG. 1 may be only one of the communication components 904A-B.

The electronic device 102 may detect that the configuration of the captured image 902 is complete by comparing the arrangement of the set of connectable components with information describing an arrangement of the set of connectable components in the recommended configuration. Upon determining that the set of connectable components is in the recommended configuration, the electronic device 102 may provide a user with access to a coding lesson and or a library of functions associated with the set of connectable components. For example, the library of functions may include functions for programming one or more of the motor components 906A-B. In addition, the electronic device 102 may automatically connect to one or more of the communication components 904A-B in order to communicate commands to the set of connectable components, such as commands to control the motor components 906A-B.

Figure 10:
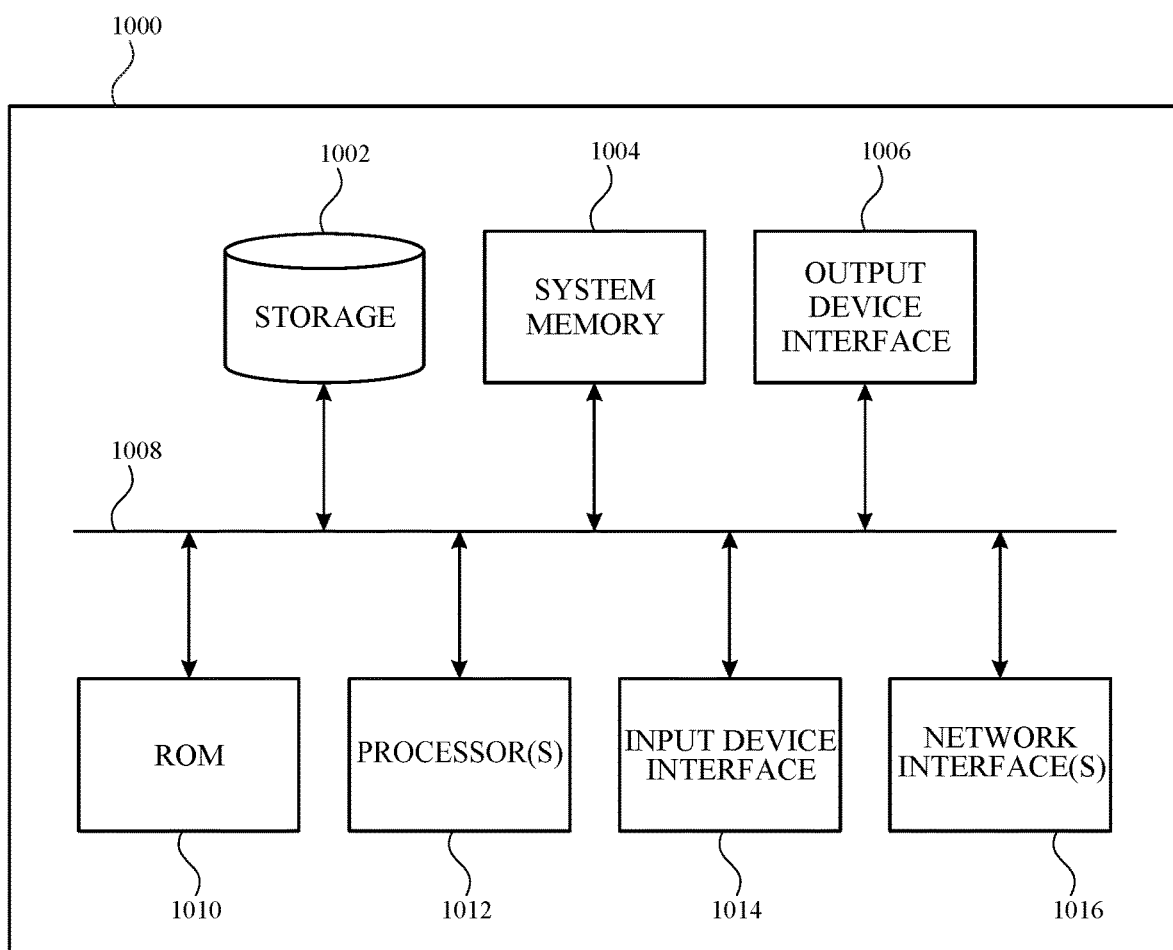
FIG. 10 conceptually illustrates an electronic system with which aspects of the subject technology may be implemented in accordance with one or more implementations.

FIG. 10 conceptually illustrates an electronic system 1000 with which one or more implementations of the subject technology may be implemented. The electronic system 1000 can be, and/or can be a part of, the electronic device 102, the programmable physical item 104, and/or the service provider server 108 shown in FIG. 1. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types)

encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
an image sensor; and
a processor configured to:
capture, using the image sensor, an image of a set of connectable components that are separate from the device;
process the captured image to detect individual connectable components of the set of connectable components and to detect a current configuration of the set of connectable components;
determine, based at least in part on the detected individual connectable components of the set of connectable components, a recommended configuration of the set of connectable components;
display information for assembling the set of connectable components into the recommended configuration from the current configuration;
detect one of the individual connectable components that comprises a communication interface, and a communication address associated with the communication interface, based at least in part on a visual identifier associated with the one of the individual connectable components;
establish a connection to the communication address associated with the communication interface of the one of the individual connectable components;
detect another of the individual connectable components that is configured to perform commands based at least in part on another visual identifier associated with the other of the individual connectable components; and
transmit, to the one of the individual connectable components that comprises the communication interface and via the communication address, at least one of the commands that the other of the individual connectable components is configured to perform.

2. The device of claim 1, wherein each of the individual connectable components is associated with a respective visual identifier.

3. The device of claim 2, wherein the processor is further configured to:
perform pattern matching on the captured image to identify the respective visual identifier associated with each of the individual connectable components.

4. The device of claim 2, wherein the respective visual identifier associated with at least one of the individual connectable components comprises at least one of a color, a shape, or a marking.

5. The device of claim 2, wherein the identifier associated with the communication interface comprises a communication address.

6. The device of claim 1, wherein the processor is further configured to:
determine, based at least in part on the current configuration, a subsequent assembly step of a sequence of assembly steps for assembling the set of connectable components into the recommended configuration; and
display an indication of the subsequent assembly step of the sequence of assembly steps.

7. The device of claim 6, wherein the processor is further configured to:
overlay, on a display of a captured image of the set of connectable components, the indication of the subsequent assembly step of the sequence of assembly steps;
capture an other image of the set of connectable components; and
determine, based at least in part on the other image, whether the subsequent assembly step of the sequence of assembly steps was properly performed.

8. The device of claim 7, wherein the processor is further configured to:
overlay, on an other display of the other captured image, an indication of whether the subsequent assembly step of the sequence of assembly steps was determined to be properly performed.

9. The device of claim 7, wherein the processor is further configured to:
repeat the overlaying, capturing, and determining with another subsequent assembly step of the sequence of assembly steps when the subsequent assembly step of the sequence of assembly steps was determined to be properly performed until the set of connectable components is assembled into the recommended configuration.

10. The device of claim 7, wherein the processor is further configured to:
detect, based at least in part on the other image, a modified configuration of the set of connectable components;
compare the modified configuration of the set of connectable components with a configuration associated with the subsequent assembly step of the sequence of assembly steps; and
determine that the subsequent assembly step of the sequence of assembly steps was properly performed when the modified configuration of the set of connectable components matches the configuration associated with the subsequent assembly step of the sequence of assembly steps.

11. The device of claim 1, wherein at least two of the individual connectable components are connected together in the current configuration.

12. The device of claim 1, wherein none of the individual connectable components are connected together in the current configuration.

13. A method, comprising:
   detecting, using a sensor, individual connectable components of a set of connectable components in a proximate area and a current configuration of the set of connectable components;
   identifying, by a processor and based at least in part on the detected individual connectable components of the set of connectable components, a recommended configuration of the set of connectable components;
   determining, by the processor and based at least in part on the current configuration, an initial assembly step of a sequence of assembly steps for assembling the set of connectable components into the recommended configuration from the current configuration;
   displaying, by the processor, an indication of the initial assembly step of the sequence of assembly steps;
   detecting, by the processor, one of the individual connectable components that comprises a communication interface, and a unique communication address associated with the communication interface, based at least in part on a visual identifier associated with the one of the individual connectable components;
   establishing a connection to the unique communication address associated with the communication interface of the one of the individual connectable components;
   detecting another of the individual connectable components that is configured to perform commands based at least in part on another respective visual identifier associated with the other of the individual connectable components; and
   transmitting, to the one of the individual connectable components that comprises the communication interface and via the communication address, at least one of the commands that the other of the individual connectable components is configured to perform.

14. The method of claim 13, further comprising:
   determining, by the processor and using the sensor, whether the initial assembly step of the sequence of assembly steps was properly performed; and
   providing, by the processor, an indication of whether the initial assembly step of the sequence of assembly steps was determined to be properly performed.

15. The method of claim 14, further comprising:
   when the initial assembly step of the sequence of assembly steps is determined to be properly performed:
      displaying, by the processor, an indication of a subsequent assembly step of the sequence of assembly steps;
      determining, by the processor and using the sensor, whether the subsequent assembly step of the sequence of assembly steps was properly performed; and
      providing, by the processor, an indication of whether the subsequent assembly step of the sequence of assembly steps was determined to be properly performed.

16. The method of claim 15, further comprising:
   repeating the displaying, determining, and providing with another subsequent assembly step of the sequence of assembly steps when the subsequent assembly step of the sequence of assembly steps is determined to be properly performed until the set of connectable components is assembled into the recommended configuration.

17. The method of claim 13, wherein at least some of the set of connectable components are connected in the current configuration.

18. A computer program product comprising code stored in a non-transitory computer-readable storage medium, the code, when executed by one or more processors, causes the one or more processors to perform operations, and the code comprising:
   code to detect, using a sensor, individual connectable components of a set of connectable components in a proximate area and a current configuration of the set of connectable components, wherein none of the individual connectable components are connected together in the current configuration;
   code to determine, based at least in part on the detected individual connectable components of the set of connectable components, an initial assembly step of a sequence of assembly steps for assembling the set of connectable components into a recommended configuration from the current configuration;
   code to display an indication of the initial assembly step of the sequence of assembly steps;
   code to detect, using the sensor, a modified configuration of the set of connectable components subsequent to display of the indication of the initial assembly step of the sequence of assembly steps;
   code to provide an indication of whether the modified configuration of the set of connectable components matches a configuration associated with the initial assembly step of the sequence of assembly steps;
   code to detect one of the individual connectable components that comprises a communication interface, and a communication address associated with the communication interface, based at least in part on a visual identifier associated with the one of the individual connectable components;
   code to establish a connection to the communication address associated with the communication interface of the one of the individual connectable components;
   detect another of the individual connectable components that is configured to perform commands based at least in part on another visual identifier associated with the other of the individual connectable components; and
   transmit, to the one of the individual connectable components that comprises the communication interface and via the communication address, at least one of the commands that the other of the individual connectable components is configured to perform.

19. The computer program product of claim 18, the code further comprising:
   code to determine an arrangement of the set of connectable components in the modified configuration;
   code to compare the arrangement of the set of connectable components in the modified configuration with arrangement information associated with the initial assembly step of the sequence of assembly steps; and
   code to provide the indication that the modified configuration of the set of connectable components matches the configuration associated with the initial assembly step of the sequence of assembly steps when the arrangement of the set of connectable components in the modified configuration matches the arrangement information associated with the initial assembly step of the sequence of assembly steps.

* * * * *